L. G. MARSHALL.
Furnace for Smelting Ores.
No. 38,906.
Patented June 16, 1863.
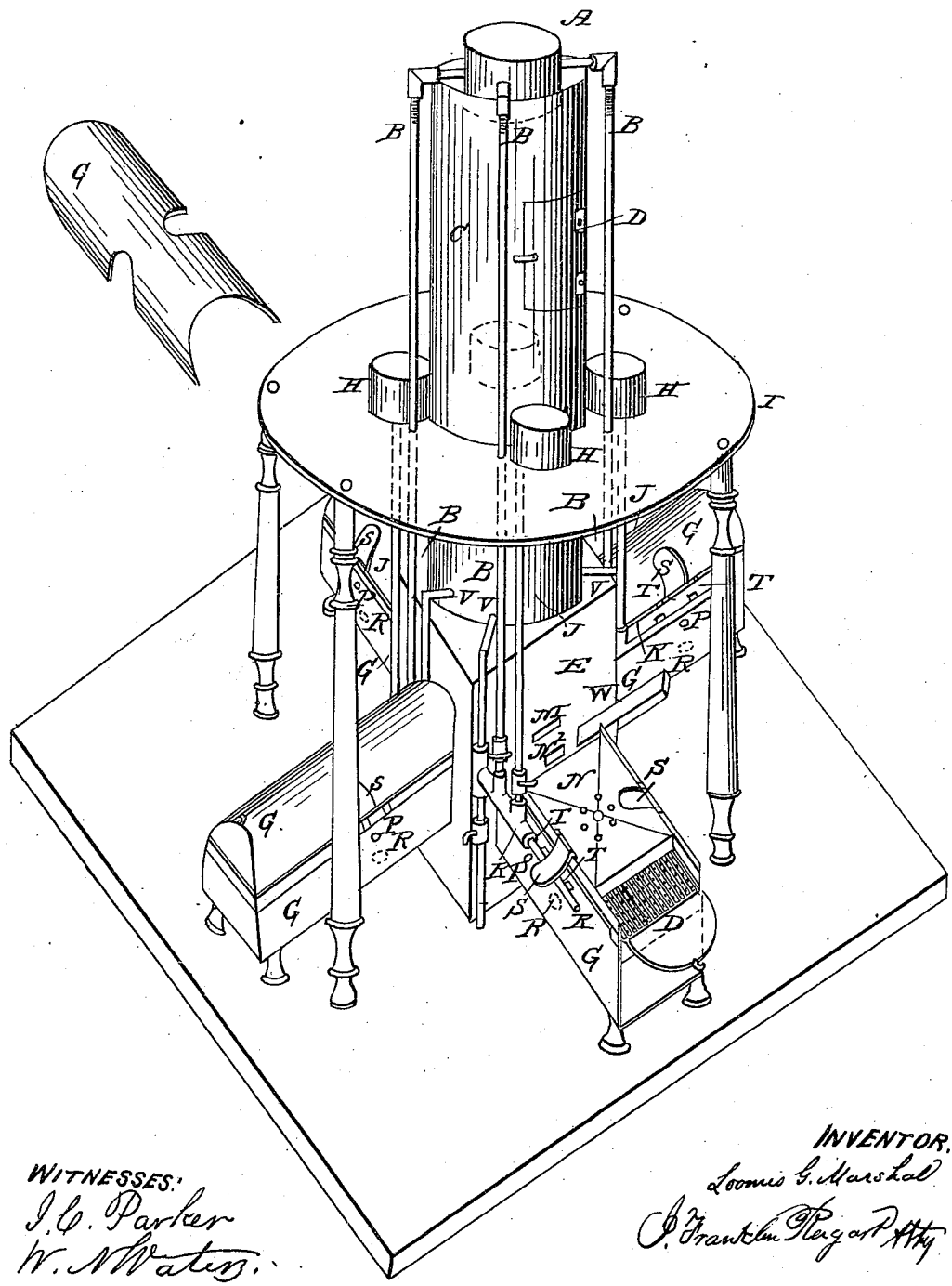
WITNESSES:
J. C. Parker
W. N. Waters
INVENTOR:
Loomis G. Marshall
J. Franklin Reigart Atty

UNITED STATES PATENT OFFICE.

LOOMIS G. MARSHALL, OF PHILADELPHIA, PENNSYLVANIA, ASSIGNOR TO HIMSELF AND ANDREW COCHRAN.

IMPROVEMENT IN FURNACES FOR REDUCING AND SMELTING ORES.

Specification forming part of Letters Patent No. 38,906, dated June 16, 1863.

*To all whom it may concern:*

Be it known that I, LOOMIS G. MARSHALL, of the city of Philadelphia and State of Pennsylvania, have invented new and useful Improvements in Furnaces, which I style the "Winged Furnace," for the purpose of Smelting the Ores and Precious Metals; and I do hereby declare that the following is a full and exact description thereof, reference being had to the accompanying drawings, and to the letters of reference marked thereon, making a part of this specification.

The nature of my invention consists in having a reservoir containing water at top of stack; also, reservoirs on a platform containing petroleum-oil, salt, &c., as a refining-flux, to be conducted down a pipe into the bottom of each wing under the fluid mass; also, the combination and arrangement of the hot air and water pipes, with the pipes conducting the flux to each side wing; also, the four side wings, as arranged on each side of stack, for refining the ores, having movable tops with side doors, and a perforated incline bed upon which the fluid mass settles through and is refined.

To enable others skilled in the art to make and use my invention, I will proceed to describe its construction and operation.

A represents the reservoir, that is located at the top of stack, containing heated water, which is a conductor and aids in fluxing the metals.

B are pipes leading from the wing of the furnace to the reservoir A.

C is the stack or bosh, with its door D at the side, through which the ores and coal are put. It has a square bottom, E, and four wings, G, connected with it, one on each side.

H is a reservoir, which contains petroleum-oil, salt, &c., mixed as a refining-flux, to be carried down its pipe J to combine with the heated air and water at the orifice-pipe K, and compose the flux at the bottom of the wing under the fluid mass. Each wing has its like furnace L in front. When it is covered, all the blast is on the fluid mass. The blast is carried through the upper aperture, M, into the bosh C, and the fluid mass is drawn from the lower aperture onto the bed N, where it is refined, left to settle, and the slag is discharged or drawn through the aperture P at the side of the wing, and the refined metal is drawn from the aperture R underneath.

S are doors at the sides of the wings, for the purpose of watching the operation of the fluxing on both sides of the wings. The pipes connect alike with the orifice-pipe K, and pass through its two conducting-pipes T into the lower part of the wing.

The hot-air pipe V extends up into the bosh or stack, and is also connected with the orifice-pipe K, to regulate the pipes B with heat. The wings are covered with a movable top, G. The platform I, that surrounds the stack, is for the purpose of enabling the workman to feed the stack with the ore and coal for the furnace underneath.

The cut-off or slide W is for the purpose of covering the lower aperture, $N^2$, and opening or closing it while the fluid is being drawn off at each one, opening one wing after the other, so as to keep drawing off continually the fluid while the fluxing is going on in the bosh C.

This furnace is intended for the smelting of all the various ores and refining the metals, and especially adapted to the smelting and refining gold, silver, copper, tin, platinum, lead, nickel, and iron by fluxing. The rock or ores are first broken into small pieces and laid in a pile. Then a thin solution of clay-water is poured on the mass until well saturated and covered. Then the mass is put into the furnace, at the door of the stack, with sufficient coal or wood to melt the same. When the metallic ores are melted in the furnace, they are drawn out into one or more of the wings, and the following fluxes are applied, viz: heated water, petroleum-oil, borax, sal-ammoniac, and prussiate of potash, in proper quantities for the different kinds of ores. The ingredients being dissolved in heated water, they are introduced into each wing through a pipe leading into orifices at both sides of each wing, and this flux is deposited in the bottom of the wing directly under the perforated bed-plate N, where the melted mass of ores is settling, and as the flux comes in contact with the intense heat, the adhesive force of the caloric vapor and the expansion being so great, it is impossible for the metal to touch the bottom before it is thoroughly expanded, and the heated air drives the heated water and the mixtures with the greatest heat known, thus purifying the metals. When the mass is well purified, the flux is shut off; but the furnace in the front end of wing is still in full blast, so as to hold the fluid mass as fluid as possible until the mass is well settled. Then the slag is drawn off through the aperture at the side, and the purified or refined metal at the aperture in the bottom of the wing.

In this furnace and by the above process, I refine iron from the ores, so as to make a good quality of steel, by adding a sufficient quantity of alcohol to the flux in the pipes, and a portion of carbon and limestone in the furnace, with petroleum-oil or their equivalents.

What I claim as my invention, and desire to secure by Letters Patent, is—

1. The arrangement of the reservoir of water at top of stack, in combination with a reservoir at side of stack, (containing the refining-flux,) with their connecting pipes, that conduct the heated water and flux to the side wings below.

2. The four side wings, with their connecting-pipes, movable top, and perforated incline, as arranged, in combination with the smelting-furnace, for the purpose of smelting and refining the ores, and drawing off the fluid continually while the fluxing is going on in the bosh.

LOOMIS G. MARSHALL.

Witnesses:
J. FRANKLIN REIGART,
JOHN S. HOLLINGSHEAD.